United States Patent [19]

Walsh et al.

[11] 4,261,329
[45] Apr. 14, 1981

[54] MULTI-TRANSPORT MODULAR SOLAR ENERGY SYSTEM

[76] Inventors: David P. Walsh; Joanne M. Walsh, both of 1400 Ramsey Dr., P.O. Box 365, Mayo, Md. 21106

[21] Appl. No.: 60,724

[22] Filed: Jul. 25, 1979

[51] Int. Cl.³ .............................................. F24J 3/02
[52] U.S. Cl. ................................. 126/417; 126/450; 180/2 A; 296/35.3; 296/182
[58] Field of Search ............... 126/417, 437, 450, 421, 126/426–427, 430, 435; 180/2 A; 296/35.3, 182; 280/475

[56] References Cited

U.S. PATENT DOCUMENTS

| 2,167,576 | 7/1939 | Kiser | 126/437 |
|---|---|---|---|
| 2,920,710 | 1/1960 | Howard | 180/2 A |
| 3,023,463 | 3/1962 | Bigelow | 52/173 |
| 3,095,616 | 7/1963 | Bigelow | 52/173 |
| 3,348,860 | 10/1967 | Buckles | 280/475 |
| 3,703,244 | 11/1972 | Walsh | 296/10 |
| 3,722,948 | 3/1973 | Walsh | 296/35.3 |
| 4,000,850 | 1/1977 | Diggs | 126/427 |
| 4,119,084 | 10/1978 | Eckels | 126/430 |
| 4,136,668 | 1/1979 | Davis | 126/430 |
| 4,144,999 | 3/1979 | Zebuhr | 126/427 |
| 4,187,831 | 2/1980 | Eubank | 126/435 |
| 4,196,718 | 4/1980 | Neustein | 126/427 |

Primary Examiner—Herbert F. Ross

[57] ABSTRACT

An independent, self-contained solar energy module for transportation and fixed accurate positioning, including an expandable transport trailer chassis, adapted to receive interchangeable types and sizes of solar energy modules having integral support frames which also engage with the transport trailer chassis. The trailer chassis provides for an adjustable load bearing tandem axle wheel unit and ramping capabilities for effectively loading and unloading the solar energy module units in their fixed accurate position.

7 Claims, 22 Drawing Figures

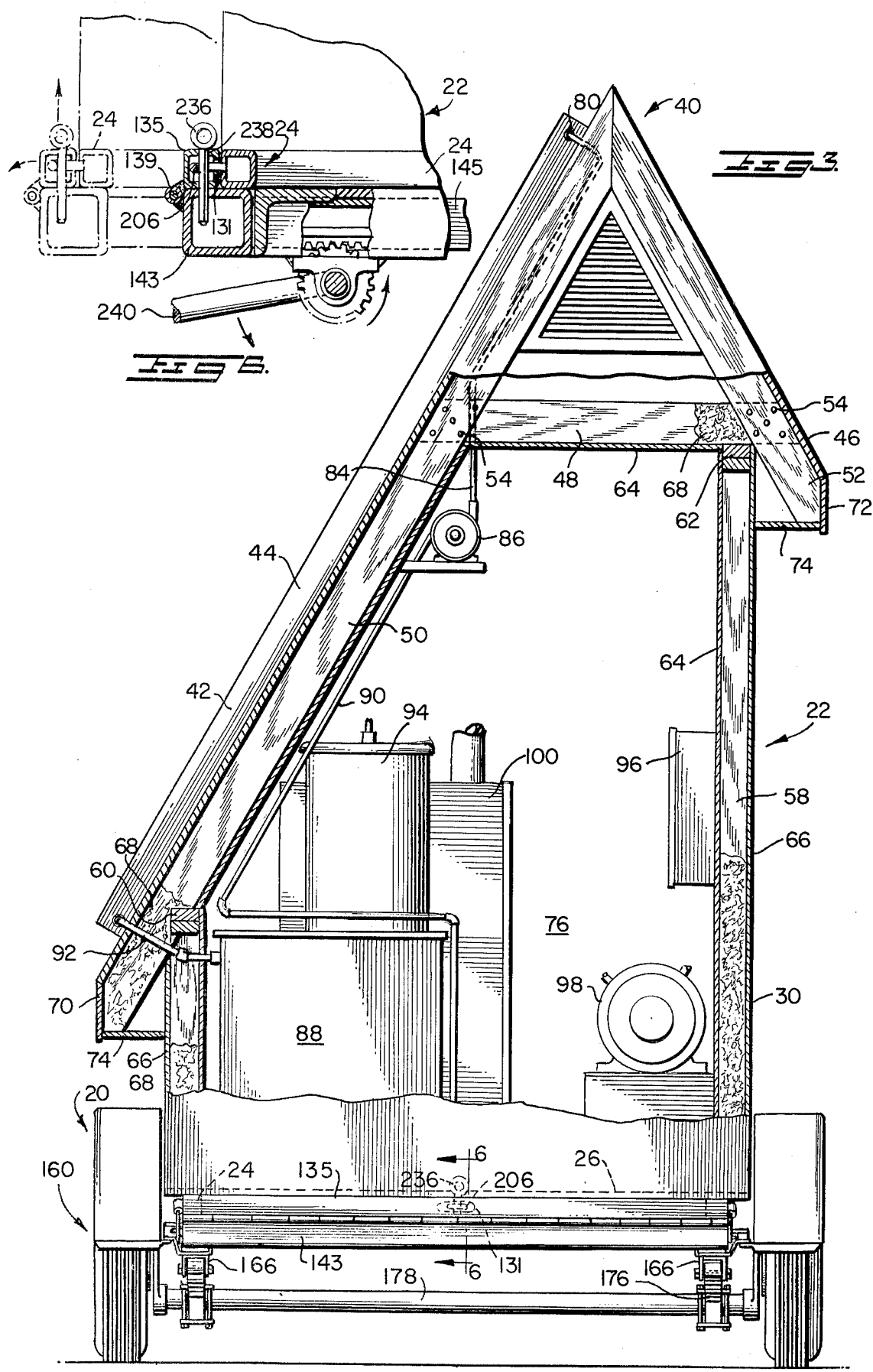

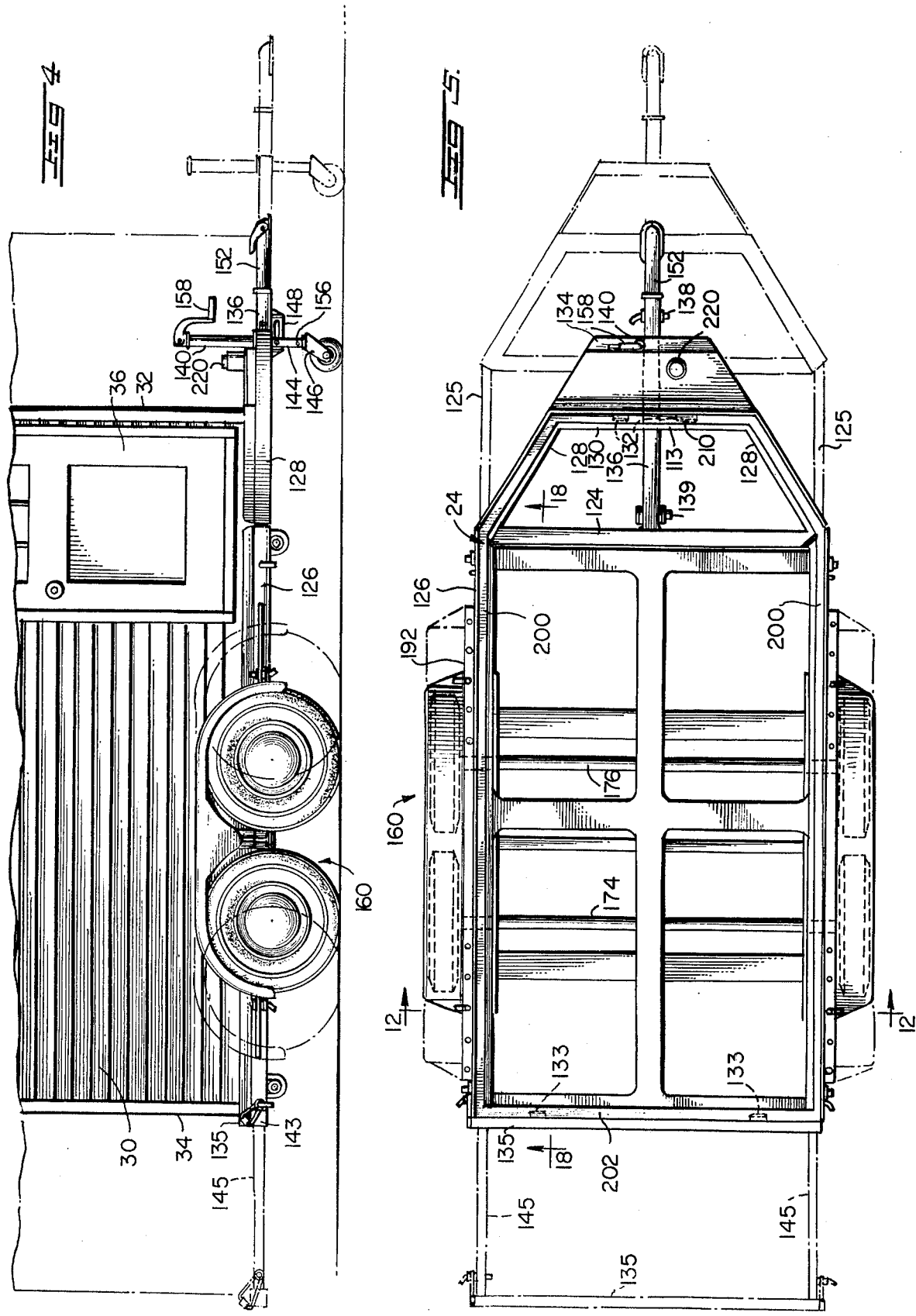

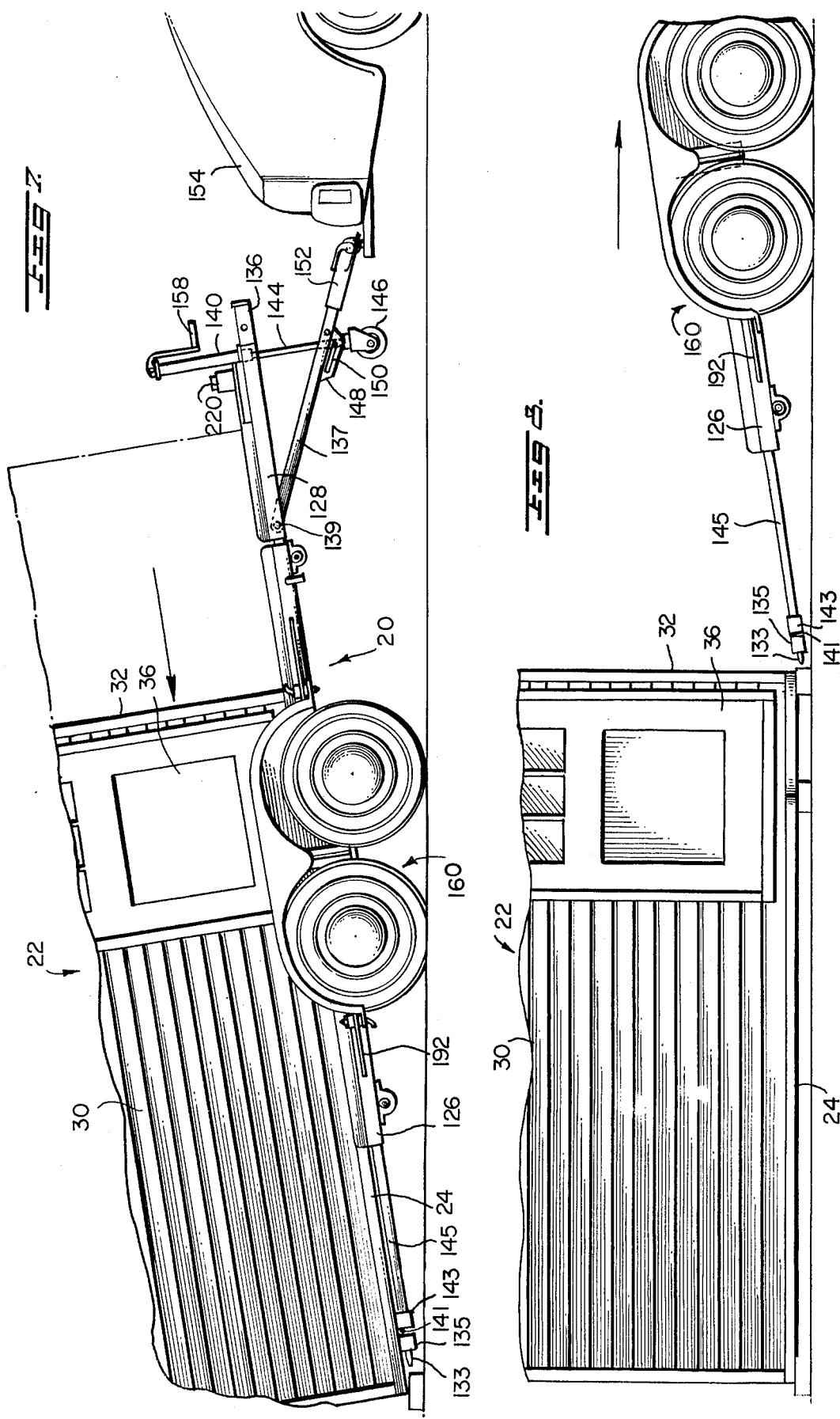

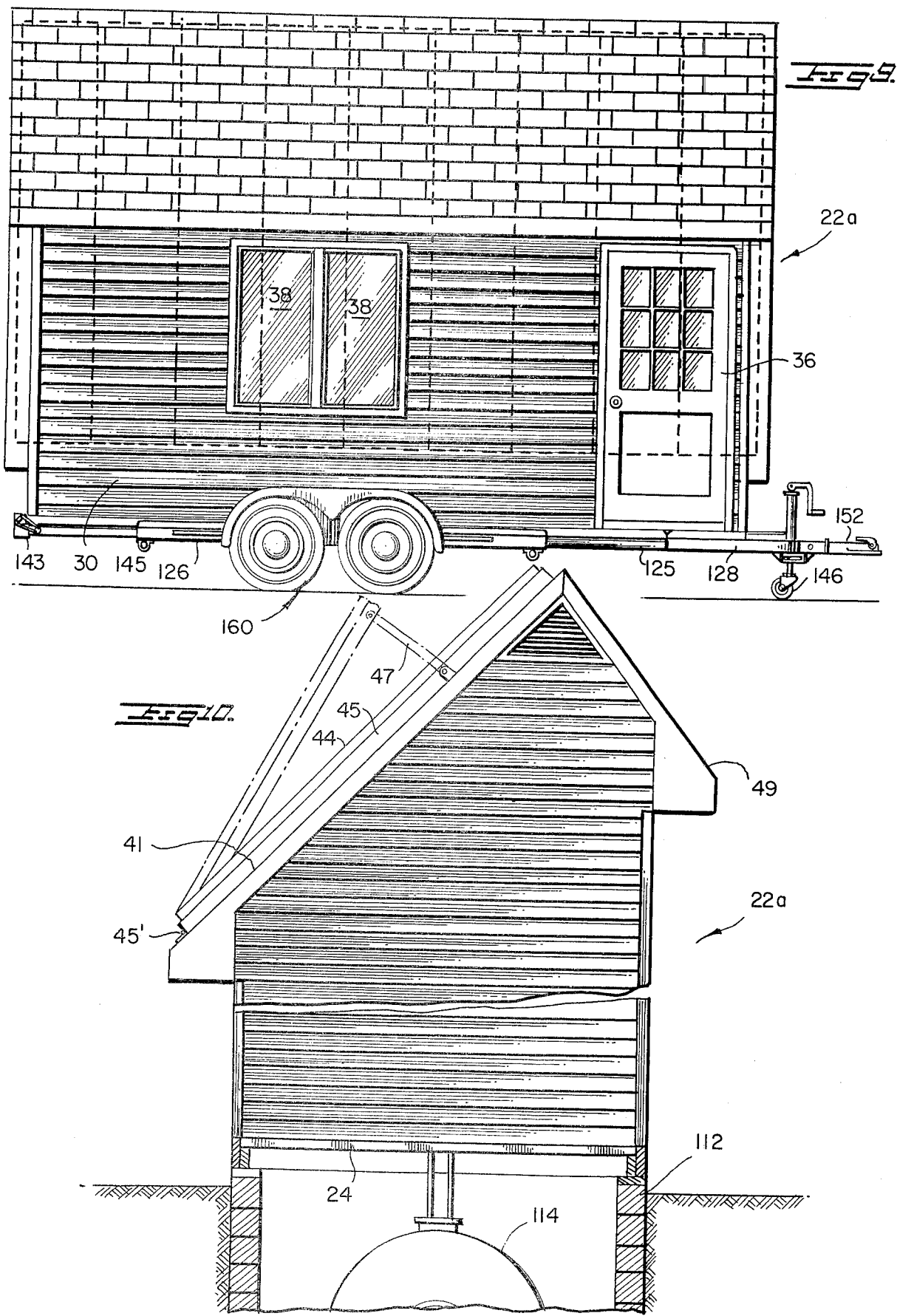

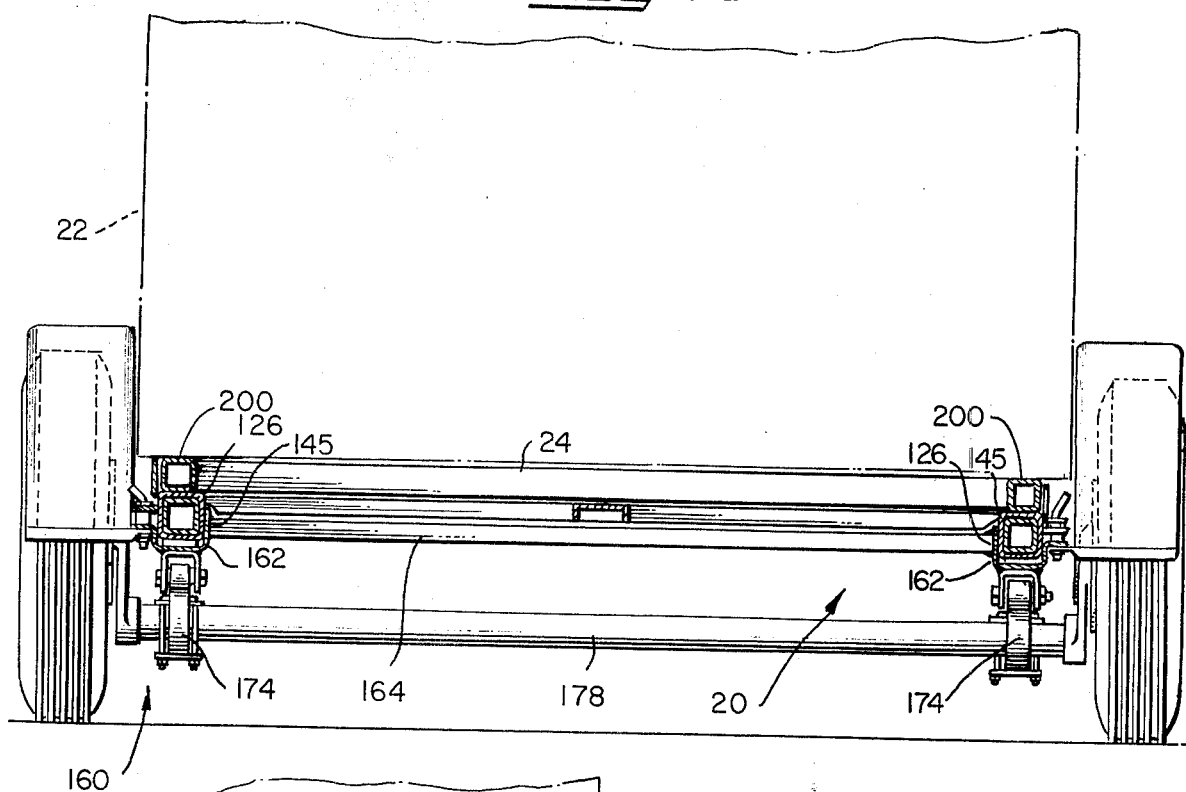
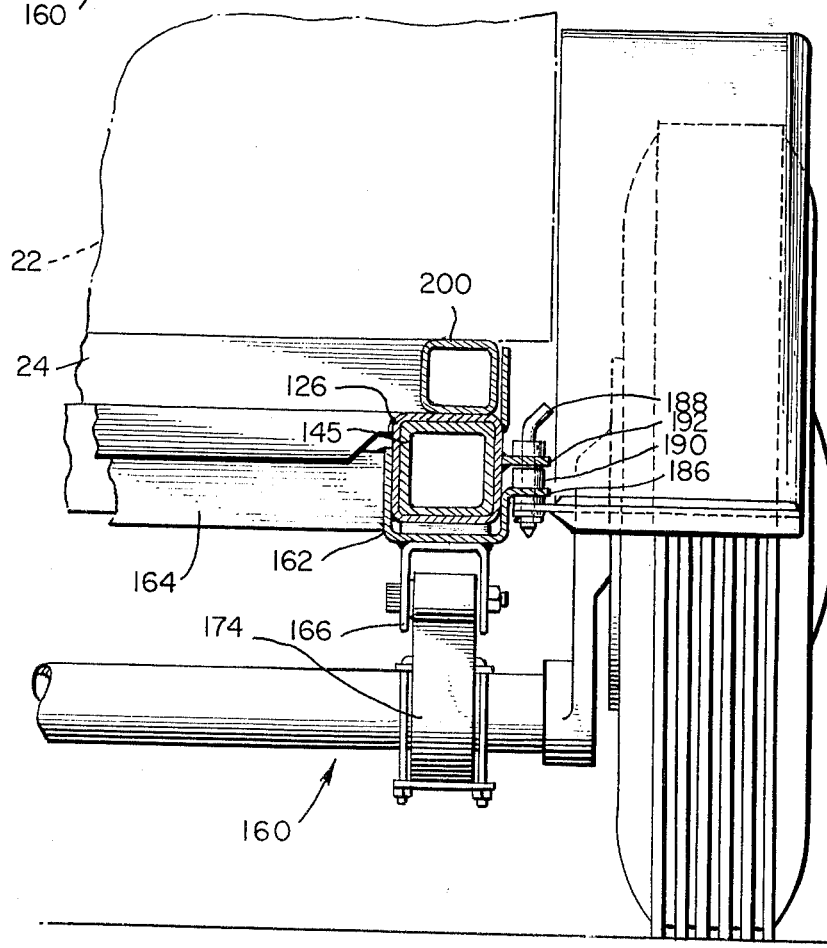

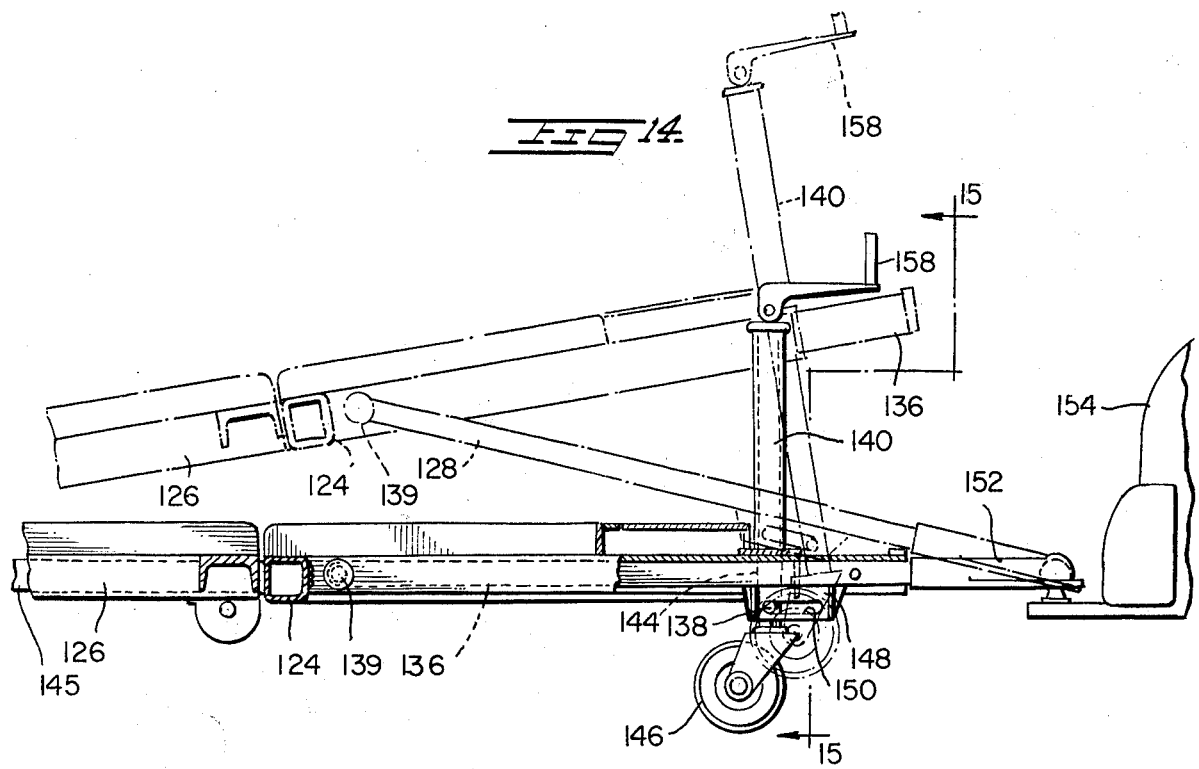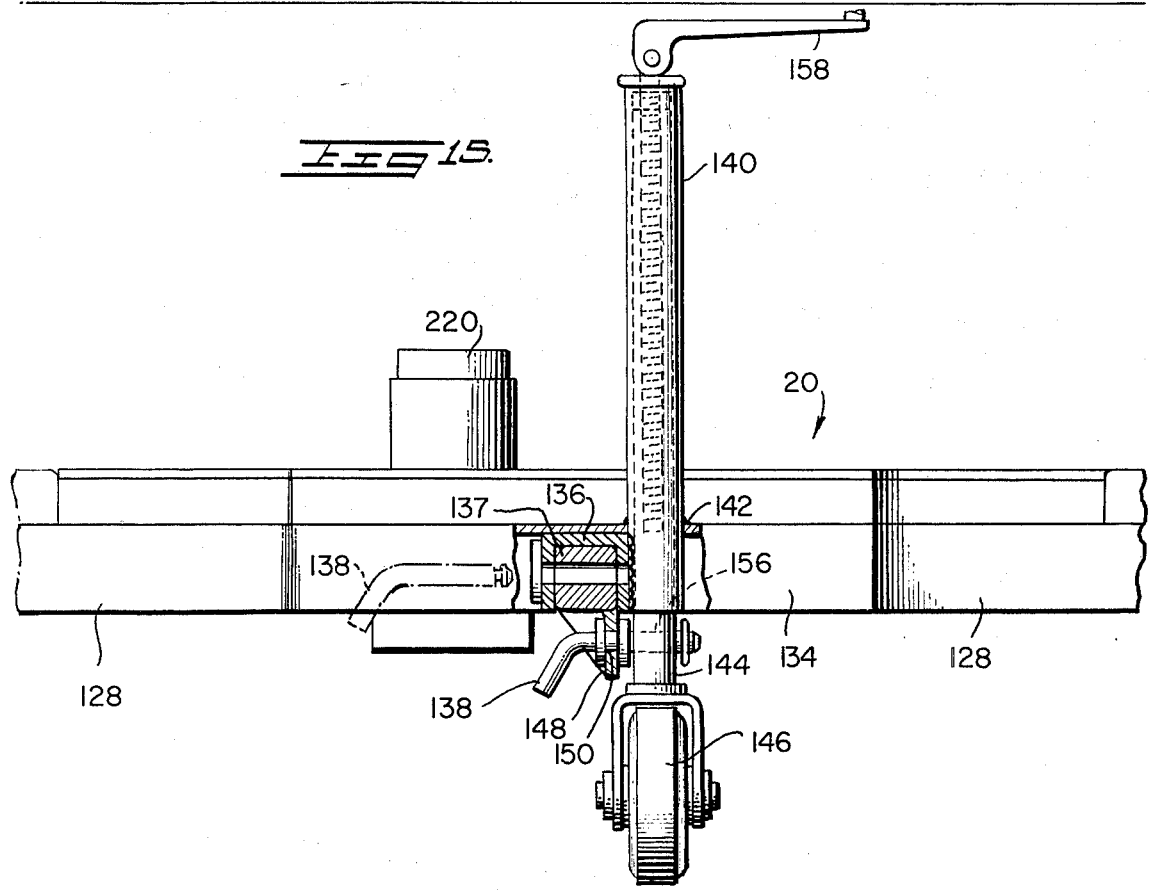

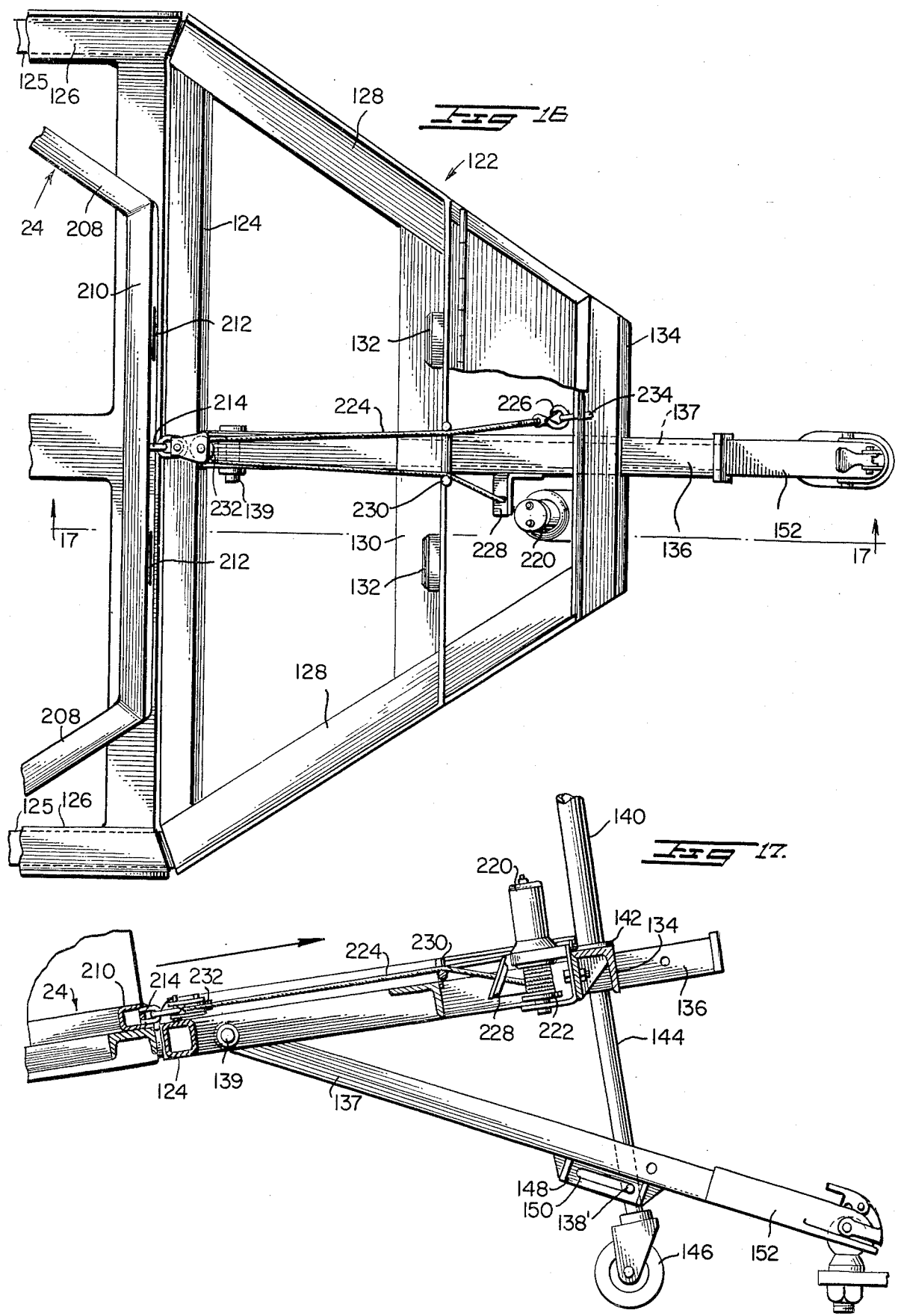

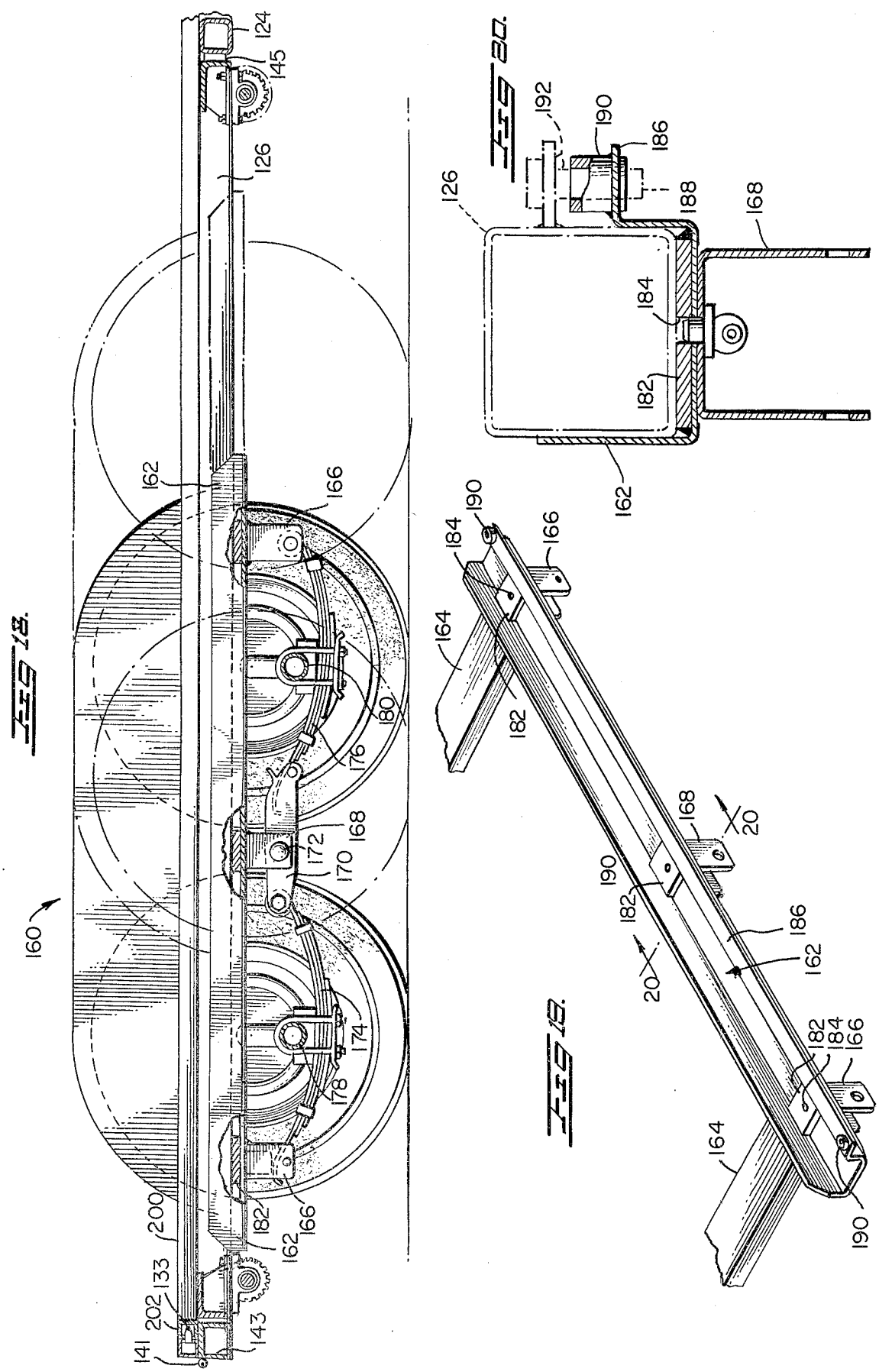

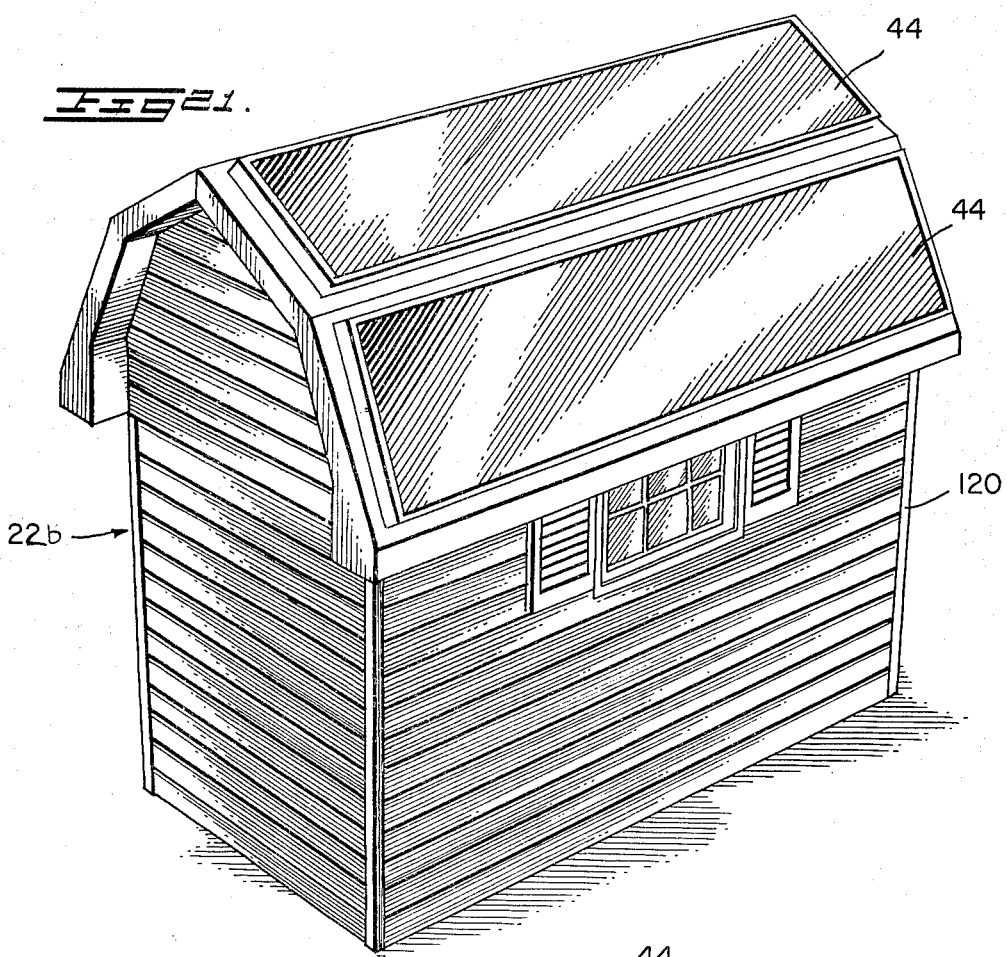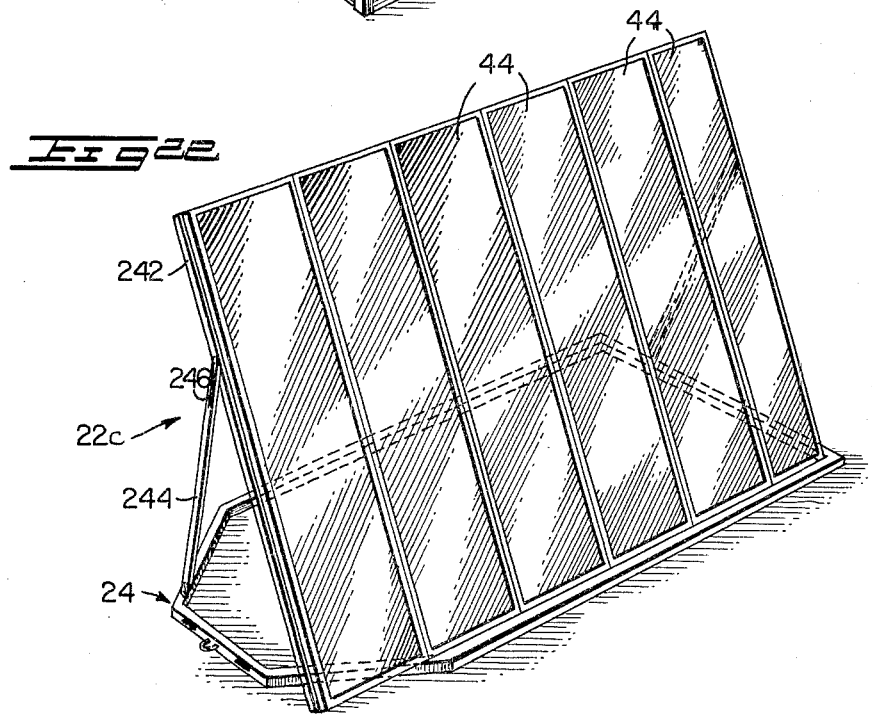

MULTI-TRANSPORT MODULAR SOLAR ENERGY SYSTEM

BACKGROUND OF THE INVENTION

It is well known that the application of solar collecting energy and distributing systems of different types are in use, and consist of solar collecting panels and associates apparatus as being integrated with an existing building or dwelling or integrated in the planning and erecting of new buildings or dwellings. In the application of solar collecting and energy distribution to an existing building or dwelling, many problems exist, such as initially providing for southern exposure and proper angular inclination of the solar collecting panels. While in some instances, an existing southerly facing roof dormer may provide a mounting surface for the collecting panels, rarely does such a dormer provide the desired angular disposition for maximum efficient performance of the panels. In most instances, a grid system has to be provided for proper panel mounting, resulting in increased expense and asthetic unsightliness. The necessary apparatus required in conjunction with the collector panels, poses another problem, both from the necessary space requirement and remote location from the collection source (such as, storage tanks, pumps, piping or ducting, controls etc.) resulting in installation difficulties and operational inefficiency due to the impractical scattered location of the necessary apparatus components and excessive piping or ducting. While such installations will provide a given degree of results, none can achieve maximum performance due to random locations, which again result in further costly installations, reduced efficiency and unsightliness. These random types of installations further lend difficulties to the proper maintenance of the systems, since the individual apparatus components co-act with one another to produce effective results.

Still another problem existing, is the tie-in with existing fuel fired furnaces, hot water heaters, space air heating, and air conditioning equipment as back up units, to supply the requirements on low solar days, or when a succession of such days result in the ineffectiveness of stored solar energy. The costly and random installation of a solar energy system becomes a permanent part of an existing building or dwelling and in cases of property resale, may not meet the desires or needs of a perspective purchaser, since, while being suitable for one occupant, does not meet the requirements of another in a practical manner. It is readily understandable that this entails a very substantial capital investment, also, compounding maintenance costs, while greatly decreasing the percentage of efficiency and a consequent reduction of return on operation and return on initial investment.

SUMMARY OF THE INVENTION

The present invention overcomes the drawback of known solar installations and for the first time, provides for a transportable, totally self-contained solar energy housing module of varying sizes, designed to provide a completely independant energy producing media unit, separate from, and independant of the existing and outdated equipment. This module permits close proximity of all necessary functional solar apparatus housed within one modular transportable solar energy unit resulting in maximum efficiency and providing for ease of installation for desired results. This then permits selection of the most desirous system, its most effective location and orientation for solar exposure.

The specific modular structure design consists of an extending angular facing roof dormer, for a southerly exposure and having maximum square footage surface area for solar panel mounting. The side wall closures of the module unit provide a room having sufficient square footage for housing all of the necessary equipment and energy storage in close proximity to one another, thereby permitting maximum efficiency and maintenance, along with cost reduction. This modular method, permits elective types of systems to be installed, such as hot water heating, space heating, space cooling or combinations thereof.

This system also provides for factory "packaging" at lower cost, along with pre-testing for rating results, elimination of changes and oversights in design and specification cycling. The integration of the collectors and control unit modules, housed within a parent module, will shorten installation time dramatically.

The solar energy modular unit is provided with a structural foundation support frame, when it is "in place" and interconnected to the structure or dwelling, to form an operative solar system. The solar module unit support frame also co-acts with a trailer chassis for transportation from a factory, to the elected site adjacent the structure or dwelling for solar energy conditioning, thereby permitting orientation of the unit on the site, so as to direct the solar collectors in a southerly direction for maximum performance.

The trailer chassis provides improvements over existing U.S. Pat. Nos. 3,703,244 and 3,722,948, in that while attached to a stationary vehicle, the chassis is provided with tilting or ramping capabilities to facilitate easy unloading of the solar unit or any other modular unit as disclosed in our previous patents, from the trailer chassis or conversely, the unit is loaded onto the trailer chassis while in the ramped position, into integral engagement with the solar unit foundation support frame to the trailer chassis for transportation. Again, in this instance, that while the factory "packaging" previously described offers many benefits, the "package" handling and transportation, provides proven, practical simplicity along with modular co-functional structural design permitting minimal and safe handling and transportation.

Other and additional advantages and features of the invention become more readily apparent from the following detailed description of preferred embodiments thereof, when taken together with the accompanying drawings in which:

FIG. 3 is a rear elevational view of FIG. 1, partially broken away, showing the solar energy unit in locked and secured relationship with the trailer chassis.

FIG. 4 is a fragmentary side elevational view of the opposite side shown in FIG. 1 of the solar energy unit, mounted for transportation on the trailer chassis and showing the expandable capabilities of the trailer chassis in phantom line, to accommodate solar energy units of varying sizes.

FIG. 5 is a top plan view of the trailer chassis with the solar energy unit support frame in integral locked and secured relationship therewith, (body unit not shown) and the expandable characteristics in phantom line of the trailer shown in FIG. 4.

FIG. 6 is an enlarged fragmentary sectional view taken along the line 6—6 of FIG. 3, showing the means by which the solar energy unit is disengaged from locked and secured engagement with the trailer chassis.

FIG. 7 is a side elevational view similar to FIG. 4, showing the solar energy unit partially removed from the ramped trailer chassis.

FIG. 8 is a fragmentary side elevational view, further showing the solar energy unit completely discharged from the trailer chassis.

FIG. 9 is a side elevational view of a larger solar energy unit in locked and secured engagement with the trailer chassis in an expanded condition.

FIG. 10 is a rear elevational view of the modified solar unit in FIG. 9, as being removed from the trailer and secured in place over a storage pit, shown in cross section.

FIG. 11 is an exploded perspective view of the trailer chassis components and the solar energy unit support frame.

FIG. 12 is a transverse sectional view taken along the line 12—12 of FIG. 5, showing the cooperative arrangement of the trailer and solar energy unit body support frame in integral engagement.

FIG. 13 is an enlarged detailed fragmentary sectional view of the right hand side of FIG. 12.

FIG. 15 is an enlarged detailed fragmentary sectional view taken along the line 15—15 of FIG. 14.

FIG. 16 is an enlarged detailed top plan view of the forward portion of the trailer showing the means for winching the solar energy unit support frame, shown partially conveyed, for locking engagement with the trailer chassis.

FIG. 17 is a detailed fragmentary longitudinal sectional view taken along the line 17—17 of FIG. 16.

FIG. 18 is an enlarged detailed fragmentary sectional view taken along the line 18—18 of FIG. 5, showing the adjustable tandem axle wheel assembly.

FIG. 19 is a perspective view of one of the cradle units for the adjustable wheeled unit assembly.

FIG. 20 is an enlarged detailed sectional view taken along the line 20—20 of FIG. 19.

FIG. 21 is a perspective view of a modified form of a solar energy unit.

FIG. 22 is a perspective view of a still further modified form, showing a solar collection unit.

Figure 1:
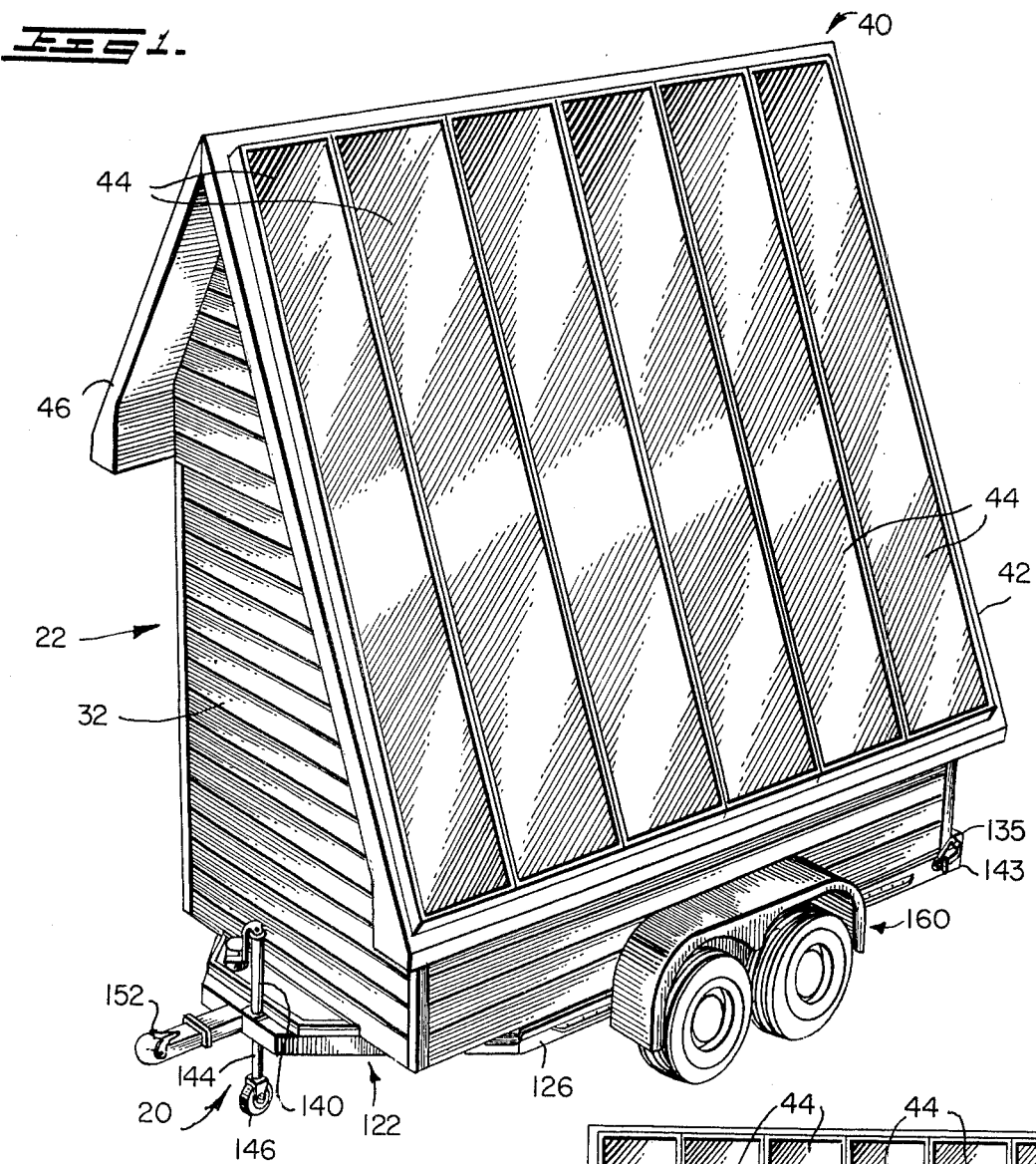
FIG. 1 is a perspective view of a solar energy unit in integral engagement with a trailer chassis for transportation to an installation site.
Figure 2:
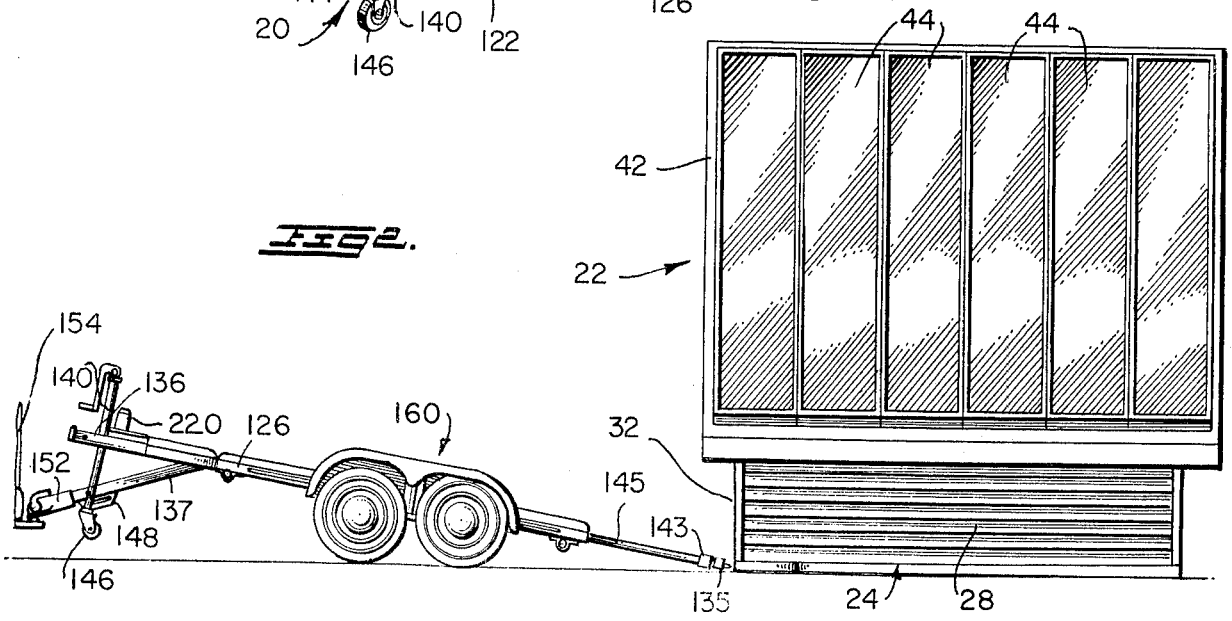
FIG. 2 is a side elevational view of a solar energy unit discharged from the trailer chassis.

Referring now in more detail to the drawings, a trailer chassis generally indicated at 20 is shown, which is adapted to receive a modular solar unit 22 generally indicated, for transportation to a predetermined site for discharge from the trailer 20 onto a site location, as best seen in FIGS. 1 and 2. The trailer 20 and its solar modular unit handling capabilities will be hereinafter described.

Referring now more particularly to the solar energy module 22 (FIGS. 1-11) is provided with a foundation support frame structure 24 having flooring 26 secured thereto, and vertical upright side walls 28 and 30 and end walls 32 and 34 securely fixed thereto. As best seen in FIG. 3, the side walls 28 and 30 are of unequal height to facilitate and effect the support of an offset ridge dormered roof generally indicated at 40, and is hereinafter described. The offset ridge roof 40 provides for an elongated slanting dormer 42 for accomodating maximum length solar collecting panels 44. The previously described offset ridge 40 provides a conventional opposite dormer 46 terminating an appropriate distance from the ground to permit installation of doors 36 or windows 38 in a conventional manner. The "A" shaped dormered ridge roof structure is provided with transverse joist members 48 secured to dormer trusses 50 and 52 as seen at 54. The side walls 28 and 30 comprise vertical stud members 56 and 58 which have support caps 60 and 62 for engagement and support of the superstructure comprising the dormer trusses 50 and transverse joist members 48. The interior walls constitute fireproof sheetrock or the like as indicated at 64 and exterior sheathing 66 with appropriate effective insulation 68 applied therebetween. The sheathing of the outer walls 28, 30, 32 and 34 may be covered with the conventional black felt and siding comensurate with the choice or accompanying decor that is compatible with the existing structure that the solar unit is to serve. The same is applicable to the roofing materials. The angular sloping dormers 42 and 46 extend downwardly and outwardly from the ridge and beyond the vertical side walls 28 and 30 to form overhangs having facia plates 70 and 72 with soffit returns 74. The width extremities of the transportable solar modular unit 22 is defined by the facia plates 70 and 72, so as to constitute a federal and state legal limit for transportation purposes without necessitating a "wide load" permit. The enclosure room solar equipment placement area indicated by the reference numeral 76, will hereinafter be described.

As seen from the foregoing, the solar energy module 22 constitutes a structurally sound facility of a configuration so as to provide an asthetically acceptable structure designed for functional capabilities for effectively providing maximum solar collecting surface and protected equipment installation area.

Since the equipment required for the various types of installation, i.e., hot water heating, hot water space heating, hot air space heating or combination thereof are variable, the solar room equipment placement area 76 provides suitable floor space and area for the different components required, dependant upon the specific system to be employed.

The solar collector panels 44 may be of the flat plate type having an inlet port 80 and an outlet port 82. The solar collector panels 44 may also be of the concentrator type having parabolic or hyperbolic reflective concentrator surfaces. It may be pointed out, at this time, that different types of collectors and systems are more advantageous under given conditions, whether they be location or climatic. There is no attempt made in this application to point out particular integrated components, such as, collectors, storage, exchangers, boilers, heatpumps, controls or the like, due to the variances mentioned above. For the sake of disclosure and operability of the modular solar energy unit of this application, however, indications are made regarding appropriate equipment which may be installed in close working relationship at the solar collection source and within the protected environment of the equipment room 76.

Referring again, and more particularly, to FIG. 3, the inlet port 80 of the solar collector panel 44 is connected to an inlet fluid feed line 84 to a circulating pump 86 and then to a fluid storage tank 88 by way of feed line 90. The outlet 82 of the solar collector 44 is connected to the fluid storage tank 88 by way of outlet line 92. This type of installation may be of the closed loop variety and may heat the stored fluid by means of an exchanger, not shown, within the tank 88. The fluid employed within the collector loop may be of a different type than that within the storage unit 88 and consequently, operate by means of a heat exchange method or may form a continuous recirculation of the stored fluid, until such time that appropriate temperatures are achieved or in the absence of solar rays. A hot water storage tank 94 may be employed in conjunction and in series with the system, or singularly, where hot water storage only is required. A program panel 96 is shown, and may be employed to regulate in timed sequence, the various components that are used with a particular installation. A heat pump 98 is shown which may operate as a booster unit to a given installation or may operate and function singularly by itself when required. An air conditioning unit 100 is shown within the area 76 for employment of a particular system and operated by means of the control panel 96. The control panel 96 may operate independantly through programming or by means of thermostats within the structure or dwelling.

In the instance where a greater number of collector panels are required, a larger solar energy unit 22a, such as that shown in FIG. 9 on the expanded trailer chassis, may be mounted over a pit 112 (FIG. 10) of conventional structure such as concrete block, having proper insulation and the larger solar energy unit 22a may be anchored thereto in a conventional manner as shown. The pit 112 contains a large storage 114 and cooperatively functions in a conventional manner with the solar energy unit. The elongated dormer 41 is shown at a greater angle than that shown in FIG. 5 and the solar collector panels 44 are mounted within a unitary grid support system 45, pivotally mounted as at 45' and angularly operative by control arm 47 terminating within the solar unit 22a. Means for operating the angular disposition of the control panels 44 may be provided by conventional automatic controls, not shown, from within the solar unit, or by manual operation.

Referring now more particularly to the trailer chassis 20, which is adapted to receive, in engaged nesting and mating relationship, the foundation support frame structure 24 of the solar energy unit 22 for transporting. The trailer chassis 20, due to its construction, described in detail hereinafter, is adapted to receive and mount in a secure manner different modular unit types or styles. Additionally, and of significance in the present invention, is the capability of the trailer chassis to be extended in length, so as to mount, nest and support modular units, not only of different types and configurations, but also of different longitudinal lengths or sizes. Additionally, the trailer chassis is capable of being inclined while in the stationary towing condition so as to provide a ramp for facilitating loading and unloading modular units. This capability will be hereinafter described.

A further improvement of the trailer chassis is the ability to longitudinally adjust the tandem axle running gear and will also hereinafter be described.

For particular structure and understanding without the above described improvements of the trailer chassis frame construction, specific reference is made to our prior U.S. Pat. No. 3,722,948, wherein specific detailed description of the various components and functions are made in detail and the necessary understanding of these details may be had by reference to this patent. Briefly, the trailer provides a multi-use transport system, wherein a main chassis for a trailer, can be had for multiple usage by association therewith of interchangeable types of trailer bodies. The individual interchangeable type trailer bodies are each provided with substantially identical foundation support frames and each of these support frames is so constructed and interrelated with the construction of the main chassis frame, so as to be selectively interchangeable, whereby each body type can be utilized with a common modular chassis frame. In accomplishing this result, the main chassis frame 20 is extensible both forwardly and rearwardly, and has a feature, a bed or recess of generally "A" shape at its forward portion, which permits the body foundation support frame to be mounted wholly and contained therein. The foundation support frame 24 includes a mating generally "A" shape at its forward end portion and the configuration serves to provide support in a load bearing manner substantially the entire length and structure of a body mounted thereto.

The heretofore mentioned ramping effect of the trailer chassis is accomplished by employment of the retracted nose wheel support generally indicated at 120, and constitutes one of the improvements over this patent. The support nose wheel 120 is located at the forward portion of the truncated "A" frame portion generally indicated at 122 and having a rear transverse end 124 adapted for mating engagement with the forward ends of the longitudinal trailer chassis frame members 126, and integral with box girders 125, being telescopically mounted within the members 126. The "A" frame is composed of merging channel members 128, which form an engageing and supporting seat for the leading end of a nested and mated foundation support frame 24, when mounted on the trailer chassis frame 20. The inner front member of the truncated "A" frame comprises a transverse beam 130, having spaced retainer lugs 132 extending therefrom, of a similar nature to the lugs 133 at the rear, fixedly secured to a transverse member 135 pivotally supported at 141 to a transverse box beam 143 (which provides a supporting seat for the rear transverse member of the foundation support frame 24) fixedly secured to longitudinal box girders 145, said girders 145 being telescopically mounted within the longitudinal trailer chassis frame members 126 of the trailer chassis frame. The transverse beam member 130, also provides a supporting seat for the forward transverse member of the foundation support frame 24. The particulars herein described are more clearly seen in FIGS. 11–17 and the various components are more fully described hereinafter. The forward portion of the truncated "A" frame structure is provided with a transverse trunction member 134 integral with the converging channel member ends 128. A forwardly extending inverted "U" shaped channel member 136 is welded or fixedly secured to the previously described transverse member 124 and extends forwardly and medially of the chassis frame, a substantial distance beyond the transverse truncation member 134. Approximate the transverse member 124 and pivotally mounted as at 139 within the inverted "U" shape member 136, an elongated ball hitch extension lever arm 137 is retained in nested and secured position for towing, by means of a locking pin 138. The modified conventional vertically mounted telescopic support nose wheel 120, is fixedly secured at one end of the outer telescopic tube 140 to the transverse truncation member 134, as at 142.

Figure 14:
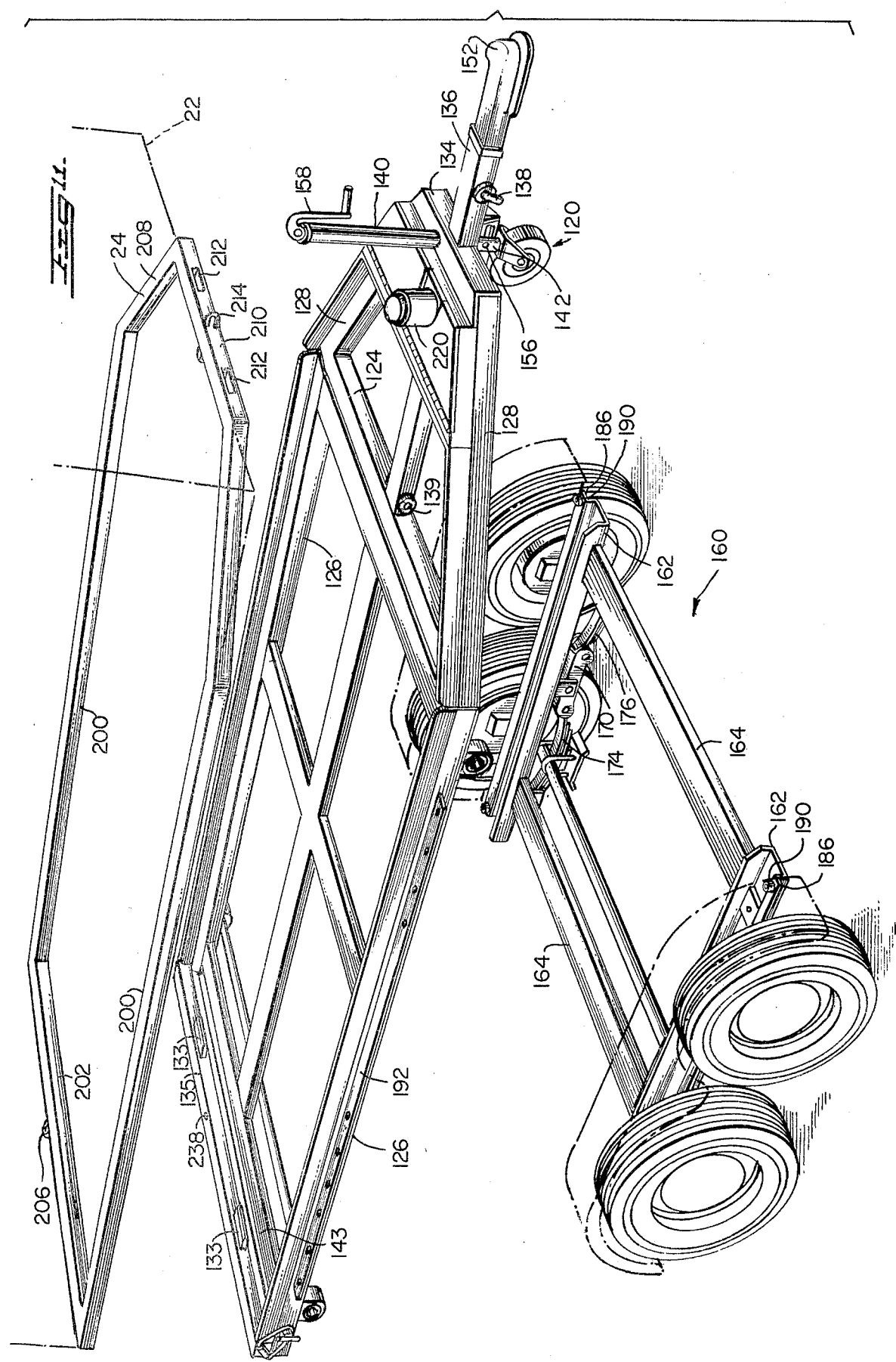
FIG. 14 is an enlarged detailed elevational view partially broken away, of the forward part of the trailer, showing the means for ramping the trailer chassis.

Referring now more particularly to FIGS. 14–17, the inner telescopic tube member 144 is provided with a pivotal nose wheel support 146 at its lower end. The tube 144 is in the telescoped retracted condition while being towed (FIGS. 14 and 15). A bracket 148 is fixedly secured to the underside of the pivotal ball hitch extension are 137 and is provided with an elongated slot 150 therein. A conventional heavy duty ball hitch 152 is secured to the outer end of the pivotal extension lever 137 and is adapted for engagement with a conventional ball mounted to the rear of a towing vehicle 154.

From the foregoing, it will be understood that when the trailer chassis unit is in position and connected to the stationary towing vehicle 154 to discharge or receive a solar energy unit mounted on a foundation support frame 24, a tilting or ramping effect of the trailer chassis 20 is accomplished by removal of the pin 138 from its towing position and inserted in the slot 150 of the bracket 148 and extends through an opening 156 of the lower portion of the telescopic tube 144 adjacent the nose wheel 146, at which time, a crank 158, rotatably mounted at the upper end of the outer telescopic tube 140, when rotated provides extension of the telescopic members 140 and 144, which effectively causes the forward truncated "A" portion of the trailer chassis 20 to rise and separate by means of a pivotal action at 139, thereby accomplishing a tilting effect which lowers the rear section of the trailer chassis 20 best seen in FIGS. 14 and 17. This tilting action provides a ramped surface in close ground or foundation approximation for easy and safe discharge of the modular unit onto ground or foundation engagement.

A further improvement of the present trailer chassis provides for longitudinal positioning of the tandem axled wheel unit generally indicated at 160. This unit 160 constitutes a unitary truck having substantially "U" shaped channel members 162 which surround the longitudinal trailer chassis frame members 126 in cup-like fashion for longitudinal reciprocal positioning thereon. The channel members 162 are securely fixed in transverse aligned relationship by spacer members 164 so as to form a single unit. Each "U" shaped channel member 162 is provided with integral bracket members 166 on the bottom of the "U" shaped channel members 162, approximate their outer ends, and central brackets 168 are medially disposed between brackets 166 as best seen in FIGS. 18-20. The brackets 168 provide for a pivotal fulcrum member 170 about a pivot pin 172 and said outer ends of the fulcrum member 170 serve as pivotal keepers for the leaf spring suspension indicated at 174 and 176 at one end, which then extend downwardly and under the drop axles 178 and 180 and are securely clamped thereto and then extend upwardly for pivotal engagement to the opposite outer brackets 166, for tandem axle suspension. The upper web face portion of the channel members 162 are provided with thrust wear pads 182, located above the brackets 166 and 168 providing load bearing facial contact with the lower web portion of the trailers longitudinal rails 126. The thrust wear pads 182 are provided with apertures 184 which supply lubricant from grease fittings on the underside of the bottom web portion of the "U" shaped channel members 162 (FIG. 20). The outer flanges of each "U" shaped channel member 162 are formed outwardly, constituting flanges 186 which provide for longitudinal securement of the truck 160 with the chassis frame side rail members 126 in the following manner. Each flange 186 is provided on either end with apertured spacer elements 190, which are aligned with a multispaced apertured outwardly extending rail member 192, fixedly secured to the outer facing side walls of the chassis frame members 126.

From the foregoing, it is understood that the tandem axle wheel suspension system 160 is mounted to interconnected "U" shaped channel members 162 for nested engagement with and longitudinal movement as a single truck unit with the longitudinal chassis frame members 126. Positioning of the truck 160 on the chassis is accomplished by locking pins 188 through apertures within the flange rails 192 and spacer elements 190 of the truck unit 160, thus insuring positive positioning and effective load bearing distribution to the expandable trailer chassis 20.

The body foundation support frame 24 can be made with lengths commensurate with the dimensions of a body to be secured thereon, but for different lengths, have a substantially identical structure. This structure includes longitudinal side rails 200, preferably of box shape, interconnected at their rear ends by transverse members 202 which is provided with elongated openings 204, therein, for mating engagement with retainer lugs 133, when in nested relation with the foundation support frame 24 and trailer chassis bed 20. A hook-eye member 206 is attached to transverse rear member 202 and serves to facilitate removal of the foundation support frame 24 and its accompanying body unit from the trailer chassis. The forward end of the foundation support frame 24 is truncated "A" frame configured as at 208 to the interior of the "A" frame channel members 128 and of substantial equal dimensions therewith. The forward end of the "A" frame consists of a transverse member 210 having openings 212 therein for mating engagement with retainer lugs 132. A hook-eye member 214 is also attached to transverse member 210 and serves to facilitate mounting and nesting of foundation support frame 24 in the bed provided by the trailer chassis 20.

From the foregoing description of the various components comprising an expandable trailer chassis unit and foundation support frame unit, having an accompanying body unit in separated condition, as viewed in FIG. 2 is provided with a power winch 220 securely mounted to the forward truncated transverse beam 134 by means of bolts or the like (FIGS. 16 and 17) and comprises a winch reel 222 for accomodating a length of heavy duty cable 224 having a detachable hook 226 at its outer end. This means for conveying the body unit 22 with its accompanying foundation support frame 24 into ramped engagement with the trailer chassis 20 is best viewed in FIGS. 16 and 17, with specific reference made thereto. The cable 224 passes through a cable guide 228 fixedly secured to the side wall of the inverted forwardly extending "U" shaped channel member 136 located in the "A" frame section of the trailer chassis 20, and then through a second guide 230, and then rearwardly to a pulley arrangement 232 secured to the hook-eye 214 of the transverse member 210, constituting the forward portion of the foundation support frame 24. On passing around the pulley 232, the cable 224 extends forwardly and through the opposite side of the guide 230 and its hook end 226 is then fastened to a link 234 secured to the transverse member 134, thus providing proper alignment and ratios to effect the conveyance of the body unit 22 with its accompanying foundation support frame 24 into secure and nested relationship with the trailer chassis 20.

Referring now more particularly to FIG. 6, which shows the particular means for disengaging the foundation support frame 24 and its accompanying body unit 22 from its locked and secured position on the trailer chassis 20, a pin 236 is inserted into an opening 238 through the transverse pivotal member 135 of the chassis 20 and also through and into the transverse box beam 143 of the chassis 20. As the pin 236 is inserted through these openings, it engages with the rear hook-eye 206 of the foundation support frame 24. The hook-eye 206 extends interiorly of the pivotal member 135 through a slot 131 and in alignment with the openings 238 and that of the box beam 143 for interengagement thereof. While in this condition, the rear telescopic portion of the chassis 20 is extended by means of rotation of a crank arm 240 and effects the extension through the associated components shown and thoroughly described in our U.S. Pat. No. 3,722,948. Upon disengagement from the chassis 20 to the phantom line position shown in FIG. 6, the pin 236 is removed and permits the transverse pivotal member 135 to be rotated to an out-of-the-way position and allows the trailer 20 to be inclined to its ramped position as previously described, allowing for the rearward discharge of the body unit 22 and its associated support frame 24 from the trailer chassis 20.

Referring now more particularly to FIG. 21, a further modified form of a solar energy unit 22b is shown as having a modified roof configuration wherein solar panels 44 are shown as being longitudinally disposed thereon, on a double dormered, southerly facing roof side.

Referring now more particularly to FIG. 22, a still further modified form 22c is shown wherein the solar panels 44 are mounted on a pivotal grid 242 connected at its bottom end to the foundation support frame structure 24 and having pivotally mounted support arms 244 secured to the frame 24 as shown, having slots 246 at their upper end to allow for angular disposition of the solar collector panels 44. This unit would be employed in the case wherein the operational solar apparatus is remotely located.

From the illustrated and described embodiments of the invention, it will be seen that great versatility and practicality of solar energy utilization is provided in conjunction with a trailer chassis, while substantially reducing cost, maintenance etc., and increasing practicalities, providing a completely safe operating unit for all combinations which might be effected.

Manifestly, minor changes in details in construction can be effected without departing from the spirit and scope of the invention as defined in and limited solely to the appended claims.

We claim:

1. In combination, an independent, self-contained solar energy module and a multiple function trailer chassis for loading, transporting, positioning and unloading said solar energy module at the point of use comprising,
   (a) an enclosed housing;
   (b) means for mounting at least one solar collecting unit on said housing;
   (c) heat exchange means located within said housing and connected to said solar collecting units;
   (d) a first support frame attached to the base of said housing;
   (e) a second, mating support frame integral with said trailer chassis for accepting said first support frame;
   (f) means for extending and ramping said trailer chassis; and,
   (g) means for lowering the forward support element of said trailer chassis to incline said chassis when loading and unloading said housing.

2. The combination of claim 1 wherein said enclosed housing comprises a structure having an elongated dormer face that is preferably oriented in a southerly direction.

3. The combination of claim 2 wherein a heat storage unit is located within said housing and connected to said heat exchange means.

4. The combination of claim 3 wherein said first support frame includes means for securing the housing to said second support means.

5. The combination of claim 4 wherein said securing means comprises lugs on said second support means and cooperating apertures on said first support means.

6. The combination of claim 5 wherein the means for extending and ramping said trailer chassis comprises a pair of longitudinal girders that are telescopically mounted for fore and aft movement within the trailer chassis and upon which the housing slides during loading and unloading.

7. The combination of claim 6 wherein the means for lowering the front support element of said trailer chassis comprises a lever arm connected to said chassis.

* * * * *